United States Patent
Guigonis et al.

(10) Patent No.: US 7,074,733 B2
(45) Date of Patent: Jul. 11, 2006

(54) UNWROUGHT REFRACTORY COMPOSITION, IN PARTICULAR FOR PRODUCING GLASS FURNACE HEARTHS

(75) Inventors: Jacques Marius Louis Guigonis, Pernes (FR); Thierry Claude Consales, Althen des Paluds (FR)

(73) Assignee: Saint-Gobain Centre de Recherches Et d'Etudes Europeen, Courbevoie (FR)

( * ) Notice: Subject to any disclaimer, the term of this patent is extended or adjusted under 35 U.S.C. 154(b) by 199 days.

(21) Appl. No.: 10/496,112

(22) PCT Filed: Nov. 19, 2002

(86) PCT No.: PCT/FR02/03950

§ 371 (c)(1),
(2), (4) Date: May 19, 2004

(87) PCT Pub. No.: WO03/043953

PCT Pub. Date: May 30, 2003

(65) Prior Publication Data
US 2004/0266604 A1 Dec. 30, 2004

(30) Foreign Application Priority Data
Nov. 20, 2001 (FR) .................................. 01 15017

(51) Int. Cl.
*C04B 35/106* (2006.01)
*C04B 35/14* (2006.01)
*C04B 35/482* (2006.01)

(52) U.S. Cl. ..................... 501/95.1; 501/105; 501/124; 501/128; 501/133

(58) Field of Classification Search ............... 501/95.1, 501/105, 106, 107, 124, 128, 133
See application file for complete search history.

(56) References Cited

U.S. PATENT DOCUMENTS

| 4,218,254 A | * | 8/1980 | Kiehl et al. ................... 501/88 |
| 4,308,067 A | | 12/1981 | Guigonis et al. |
| 5,753,572 A | | 5/1998 | Macey et al. |

FOREIGN PATENT DOCUMENTS

| GB | 2 112 374 | | 7/1983 |
| JP | 03075274 A | * | 3/1991 |
| JP | 11-159970 | | 9/1999 |

* cited by examiner

*Primary Examiner*—David Sample
(74) *Attorney, Agent, or Firm*—Young & Thompson

(57) ABSTRACT

An unwrought refractory composition, in particular for producing glass furnace hearths, includes a base mixture comprising in wt. %: 1 to 6% of a hydraulic cement, and 94 to 99% of particles of at least a refractory material mainly consisting of alumina ($Al_2O_3$), zirconia ($ZrO_2$) and silica ($SiO_2$), the fraction of the particles of the base mixture having a size less than 40 µm being distributed in wt. % relative to the weight of the base mixture, as follows: fraction<0.5 µm: $\geq$4%; fraction<2 µm: $\geq$5%; fraction<10 µm: $\geq$16%; fraction<40 µm: 29–45%, the refractory composition further comprising, in wt. % relative to the weight of the base mixture: 0.02 to 0.08% of organic fibers, and 0.075 to 1% of a surfactant.

18 Claims, No Drawings

UNWROUGHT REFRACTORY COMPOSITION, IN PARTICULAR FOR PRODUCING GLASS FURNACE HEARTHS

The present invention relates to an unshaped refractory composition, in particular for producing glass furnace hearths. The expression "refractory composition" means a composition for producing a refractory material.

The glass industry usually employs for the construction of its furnaces blocks or slabs of fused cast or bonded refractory products that are highly resistant to corrosion by glass.

To prevent infiltration of molten glass between the blocks or slabs, it is sometimes necessary to use unshaped refractory materials to joint the blocks or slabs. The problem is particularly acute in connection with the hearths of glass furnaces, where infiltration of glass between the slabs causes corrosion of the materials used to form the layer underlying the slabs, called the bed, followed by corrosion of the slabs themselves.

The patent FR-B-2458520 describes a refractory composition for producing this kind of unshaped refractory material. This refractory composition, based on particles of a fused cast refractory material containing a vitreous matrix, is widely used but has the drawback that, after it is moistened, it cannot be pumped by pumps producing aspiration pressures less than or equal to 180 bar.

Pumpable refractory compositions used for jointing metal furnace blocks are known in the art. However, the constraints in that application are very different from those encountered in the application to glass furnaces. The conditions of corrosion of the furnaces by a molten glass or metal are also different.

Certain impurities, tolerated in furnaces for producing metals, are unacceptable for the fabrication of glass. In particular, the refractory materials used in glass furnaces must not generate faults such as leaching of stones through fragmentation of the refractory material into the bath of molten glass or the production of bubbles. Thus a refractory composition intended for a furnace for producing metals is not, a priori, suitable for a furnace for making glass.

There is therefore a need for refractory compositions that may be used in glass furnaces and pumped more easily than the prior art compositions.

The present invention aims to satisfy this need. The invention relates more particularly to an unshaped refractory composition, in particular for producing glass furnace hearths, that is noteworthy in that it comprises a basic mixture comprising:

1 to 6% by weight of a hydraulic cement, and
94 to 99% by weight of particles of at least one refractory material whose main constituents are alumina ($Al_2O_3$), zirconia ($ZrO_2$) and silica ($SiO_2$), the fraction of the particles of said basic mixture having a size less than 40 μm being distributed in the following manner relative to the weight of said basic mixture:
fraction<0.5 μm: ≧4% by weight
fraction<2 μm: ≧5% by weight preferably 8% by weight
fraction<10 μm: ≧16% by weight
fraction<40 μm: 29–45% by weight preferably 30–45% by weight said refractory composition further comprising, relative to the weight of said basic mixture,
0.02 to 0.08% by weight of organic fibers, and
0.075 to 1% by weight, preferably 0.1 to 1% by weight, of a surface-active agent.

The expression "main constituents" means the majority constituents, i.e. those with the highest proportions by weight.

As will emerge in more detail in the remainder of the description, a composition of the above kind may be pumped with aspiration pressures less than or equal to 180 bar and may be used to prepare a material suitable for producing glass furnace hearths.

According to other features of the composition according to the invention:
said basic mixture contains:
  $Al_2O_3$: 45–65% by weight,
  $ZrO_2$: 20–35% by weight,
  $SiO_2$: 12–20% by weight;
said composition further comprises 4 to 5.5% of water relative to the total weight of said basic mixture;
the fraction of the particles of said basic mixture having a size less than 500 μm represents more than 50% by weight of said basic mixture;
the fraction of the particles of said basic mixture having a size from 40 to 500 μm is from 15 to 30% by weight of said basic mixture;
said refractory material particles contain 3 to 5% of fumed silica;
the fraction of the particles of said basic mixture having a size of less than 40 μm is distributed in the following manner relative to the weight of said basic mixture:
  fraction<0.5 μm: ≧5% by weight,
  fraction<2 μm: ≧10% by weight,
  fraction<10 μm: ≧22% by weight,
  fraction<40 μm: 30–45% by weight;
the proportion of silica in the fraction of said particles of said basic mixture having a size less than 500 μm is less than or equal to 16% by weight relative to the total weight of said fraction;
the proportion of silica in the fraction of said particles of said basic mixture having a size less than 500 μm is less than or equal to 14.5% by weight relative to the total weight of said fraction;
the proportion of silica in the fraction of said particles of said basic mixture having a size less than 40 μm is less than or equal to 14.5% by weight of the total weight of said fraction;
said basic mixture comprises 3 to 5% by weight of said hydraulic cement;
said composition comprises 0.01 to 0.15% by weight of a hardening accelerator relative to the weight of said basic mixture;
said surface-active agent is a compound from the family of modified polycarboxylates.

The invention also provides a refractory product obtained by sintering a refractory composition according to the invention.

According to other features of a refractory product according to the invention:
$((L_{max}-L_{1350})/L) \leq 0.5\%$, where $L$, $L_{max}$ and $L_{1350}$ designate the length of a sample of said product at ambient temperature, at a maximum expansion temperature, and at a temperature of 1350° C., respectively;
the refractory product has a maximum expansion temperature ($Td_{max}$) greater than 1100° C.

Said particles (a) of fused cast refractory material may consist of refractory materials having diverse chemical analyses. The particle size distributions of the particles may also differ according to the material constituting them provided that the overall particle size constraints imposed by the invention are complied with.

Various refractory materials may be used to obtain the particles (a), for example sourced from:

- electrofused refractory products such as the ER-1681 and ER-1711 products manufactured and sold by the Société Européenne des Produits Réfractaires; these two products, listed as "AZS particles" in table 1 (because of their contents of $Al_2O_3$, $ZrO_2$ and $SiO_2$), contain the following percentages by weight, based on oxides: 32 to 54% of $ZrO_2$, 36 to 51% of $Al_2O_3$, 2 to 16% of $SiO_2$ and 0.2 to 1.5% of $Na_2O$;
- fused mullite refractory products, listed as "mullite" in table 1, for example a powder that contains 76.5% of $Al_2O_3$ and 22.5% of $SiO_2$ and in which the particle size varies from 0.7 to 1.5 mm;
- products with a high content of zirconia, listed as "zirconia" in table 1, such as the CS10 product from the Société Européenne des Produits Réfractaires; this product contains more than 99% of $ZrO_2$ and the median diameter (D50) of the zirconia particles is 3.5 μm;
- reactive alumina, or a mixture of reactive aluminas, containing more than 99% of $Al_2O_3$, the median diameter of the reactive alumina particles varying from 0.5 μm to 3 μm;
- electrofused alumina with a particle size from 0.04 to 0.5 mm;
- silica such as "fumed silica" from the Société Européenne des Produits Réfractaires; this vitreous silica contains more than 93% silica ($SiO_2$) and takes the form of a powder whose particle size ranges from 0.1 to 5 μm with a median diameter of 0.5 μm.

The presence of this species advantageously reduces the quantity of water needed to make the refractory composition pourable. It appears that the very fine particles of silica are well distributed in the composition and produce a good bond in the sintered final product. For this purpose, it is considered necessary to have from 3 to 5% of fumed silica in the composition.

The hydraulic cement, refered to as (b), constitutes from 1 to 6% by weight of the basic mixture (a)+(b), and preferably 3 to 5% by weight thereof. The hydraulic cement (b) may be an aluminous cement or a mixture of different cements. To limit the content of lime (CaO), it is preferred to use a cement with a high alumina content, such as the CA25 cement from the company Alcoa, which contains more than 78% of $Al_2O_3$ and less than 19% of CaO. The particles of CA25 have a median diameter of approximately 8 μm.

To produce the basic mixture (a)+(b) used for the refractory composition of the invention, particles of (a) and (b) are mixed in proportions of 94 to 99% by weight and 1 to 6% by weight, respectively, so that, in the resulting basic composition, 30 to 45% by weight of the particles have a size less than 40 μm, at least 16% by weight of the particles have a size less than 10 μm, at least 8% by weight of the particles have a size less than 2 μm, and at least 4% by weight of the particles have a size less than 0.5 μm.

It is clear that particles having a size less than 10 μm are included in the 30 to 45% of particles having a size less than 40 μm, that particles having a size less than 2 μm are included in the particles having a size less than 40 μm and in those having a size less than 10 μm, etc.

The refractory composition of the invention further includes organic fibers (c) in a proportion of 0.02 to 0.08% by weight of the total weight of (a) and (b). These fibers are polypropylene, polyacrylonitrile or polyvinyl alcohol fibers, for example, the mean length of which varies from 18 to 24 mm.

The presence of organic fibers improves the strength of the raw composition and prevents the appearance of cracks on drying. Moreover, the organic fibers (c) are eliminated during the phase of raising the temperature of the furnace, thereby creating a network of small passages allowing more effective evacuation of water.

For these reasons it is necessary to have at least 0.02% of fibers relative to the total weight of the basic composition. On the other hand, beyond 0.08%, the proportion of fibers becomes too great for the composition to be pumped.

The refractory composition according to the invention further contains at least one surface-active agent (d) in a proportion of 0.1 to 1% of the total weight of (a) and (b). The function of the surface-active agent is to modify the rheological properties of the composition to make it easier to pump.

Modified polycarboxylate surface-active agents are preferably used.

The refractory composition of the invention preferably further contains at least one hardening accelerator (e) for compositions using a hydraulic cement, in a proportion of 0.01 to 0.15% relative to the total weight of (a) and (b). Such hardening accelerators are known to the person skilled in the art.

The refractory composition takes the form of a powder that is easy to handle.

To use the composition of the invention, the various constituents are mixed intimately with a quantity of water (f) varying from 4 to 5.5% by weight relative to the total (a)+(b).

This mixture, which is itself a refractory composition according to the invention, may advantageously be pumped directly into the glass furnace using a piston pump, for example to form the sub-layer of the hearth. It may then simply be poured or puddled using a vibrating beam.

The mixture remains at ambient temperature. Subsequent heating of the furnace then sinters the mixture.

The refractory composition of the invention may also be used to fabricate parts with standard dimensions that are assembled into glass furnaces.

The following nonlimiting examples are intended to illustrate the invention.

Various basic mixtures (a)+(b) are mixed with organic fibers (c), a surface-active agent (d) and water (f) to obtain refractory compositions 1 to 16.

Table 1 gives the composition of the corresponding 16 basic mixtures (a)+(b). It also indicates the particle size distribution of the AZS particles used in these basic mixtures. Finally, it gives the contents of $Al_2O_3$, $ZrO_2$ and $SiO_2$ of the materials obtained from the refractory compositions 1 to 16. These contents are substantially equal to the contents of $Al_2O_3$, $ZrO_2$ and $SiO_2$ in the corresponding basic mixtures (a)+(b).

Table 2 gives the compositions of the refractory compositions 1 to 16.

Pumping of these refractory compositions is attempted using a PUTZMEISTER BSA 1002 pump. In the table, "P" designates the aspiration pressure necessary for pumping.

The refractory compositions 1 to 16 are then used to fabricate refractory slabs.

A sample is taken from each of the refractory slabs to evaluate expansion behavior. Given the contents of $Al_2O_3$, $ZrO_2$ and $SiO_2$, the materials of these refractory slabs belong to the AZS family. Consequently, when the samples are heated to 1350° C., they expand up to a maximum expansion temperature $Td_{max}$ and then contract. The temperature $Td_{max}$ and the expansion $\Delta L$ % are measured.

ΔL % is equal to the ratio of the difference of the lengths $L_{max}$ and $L_{1350}$ of the sample at $Td_{max}$ at 1350° C., respectively, to the original length L of the sample at an ambient temperature of approximately 20° C., in other words: ΔL %=$(L_{max}-L_{1350})$/L.

The expansion of a refractory material generates thermo-mechanical stresses that may cause cracks. It is therefore preferable for the maximum expansion temperature $Td_{max}$ to be close to the operating temperature, which is generally from 1250 to 1300° C.

Table 3 gives the results of tests carried out on the samples obtained from the refractory compositions 1 to 16, the silica ($SiO_2$) contents of the 0–500 μm and 0–40 μm fractions of the basic mixtures (a)+(b) used to fabricate the samples, and the particle size distribution of the basic mixtures (a)+(b).

In table 1, the AZS particles are obtained by grinding a refractory product comprising: 51% by weight of $Al_2O_3$, 33% by weight of $ZrO_2$ and 15% by weight of $SiO_2$.

The prior art composition 1 serves as a reference composition. It corresponds to the ERSOL product from the Société Européenne des Produits Réfractaires. This product is an unshaped refractory that is useful for filling the joints between the blocks or slabs and/or for forming the layer in glass furnaces underlying the slabs, called the bed. In table 2, the surface-active agent "A" is a long-chain sodium polyphosphate and the surface-active agents "B" and "C" are compounds from the family of modified polycarboxylates.

The choice of a surface-active agent from the surface-active agents usually employed by the person skilled in the art is guided by the results of simple tests, as described in the present application, as a function of the required performance (pumpable nature of the refractory composition, expansion properties of the refractory material obtained).

From table 3, the improvement in the pumpability of a composition depends on the distribution of the particles in the various particle size ranges less than 40 μm. It is observed that the following distribution, as a percentage by weight relative to the weight of the basic mixture, advantageously makes the refractory position pumpable with an aspiration pressure less than 120 bar:
    fraction<0.5 μm: ≧4%,
    fraction<2 μm: ≧8%,
    fraction<10 μm: ≧16%,
    fraction<40 μm: 30–45%.

It is thought that this kind of representation of the various fractions yields a homogeneous arrangement and more compact packing of the various particles.

Moreover, it may equally be assumed that the high content (from 30 to 45% in the case of the invention) of particles with a size less than 40 μm, called "ultrafine" particles, enables larger particles to slide and roll on each other, which would supposedly improve flow and prevent the phenomenon of drying out, i.e. the separation of the coarsest particles and the finest particles.

Table 1 further shows that, in the basic mixtures (a)+(b) of pumpable refractory compositions, the proportion of fine particles, i.e. those whose size is from 40 to 500 μm, is from 15 to 30% by weight of the total weight (a)+(b). In these basic mixtures, the fraction<500 μm accounts for more than 50% by weight of the total weight (a)+(b).

The particle size distribution of ultrafine particles in the basic mixture (a)+(b) as a percentage by weight relative to the weight of the basic mixture is preferably as follows:
    fraction<0.5 μm: ≧5%,
    fraction<2 μm: ≧10%,
    fraction<10 μm: ≧22%,
    fraction<40 μm: ≧30%.

In table 3, it is also seen that the refractory materials obtained from the compositions 8, 10 and 16 advantageously have an improved expansion behavior (significant reduction of ΔL % and/or increase in $Td_{max}$) compared to the refractory material produced from the reference composition 1.

Moreover, the refractory materials produced from the compositions 5, 7, 9, 12 and 13 advantageously have very good expansion behavior. For these materials, ΔL % is less than or equal to 0.5% and $Td_{max}$ is greater than or equal to 1100° C.

These expansion behaviors seem to be linked to the proportion of silica in the fraction of fine and ultrafine particles (passing through a 500 μm and a 40 μm mesh, respectively). Note that, in the proportion of fine particles (passing through a 500 μm mesh), the silica content should preferably be less than or equal to 16% by weight and more preferably less than or equal to 14.5% by weight.

The silica content of the fraction of ultrafine particles (passing through 40 μm mesh) should preferably be less than or equal to 14.5% by weight.

Finally, table 3 indicates that the refractory materials produced from compositions of the invention contain:
    $Al_2O_3$: 45–65% by weight,
    $ZrO_2$: 20–35% by weight,
    $SiO_2$: 12–20% by weight.

Corrosion tests have also confirmed that the behavior of refractory products of the invention is not degraded relative to that of the reference refractory product from test 1. In particular, the corrosion indices of refractory products resulting from tests 1 and 13 in alkali-lime glass at 1350° C. are substantially equal.

Finally, the refractory product resulting from test 13 has not shown any tendency to generate more defects (bubbles or stones) than the reference refractory products resulting from test 1.

TABLE 1

Composition of basic mixtures used to produce the refractory compositions 1 to 16

Basic mixture (a) + (b) % by weight

| | AZS particles | | | | | | Electro-fused | Fumed | | Content % by weight | | |
|---|---|---|---|---|---|---|---|---|---|---|---|---|
| N° | 2–5 mm | 0.5–2 mm | 40–500 μm | 0–40 μm | Mullite | Zirconia | Reactive aluminas | alumina | silica | Cement | $Al_2O_3$ | $ZrO_2$ | $SiO_2$ |
| 1 | 26 | 30 | 19 | 16 | | | | | 5 | 4 | 49.6 | 30 | 18.7 |
| 2 | 26 | 30 | 19 | 16 | | | | | 5 | 4 | 49.6 | 30 | 18.7 |

TABLE 1-continued

Composition of basic mixtures used to produce the refractory compositions 1 to 16

Basic mixture (a) + (b) % by weight

| N° | AZS particles 2–5 mm | 0.5–2 mm | 40–500 µm | 0–40 µm | Mullite | Zirconia | Reactive aluminas | Electro-fused alumina | Fumed silica | Cement | Content % by weight Al₂O₃ | ZrO₂ | SiO₂ |
|----|------|------|------|------|------|------|------|------|------|------|------|------|------|
| 3 | 20 | 25 | 24 | 22 | | | | | 5 | 4 | 49.6 | 30 | 18.7 |
| 4 | 20 | 25 | 24 | 22 | | | | | 5 | 4 | 49.6 | 30 | 18.7 |
| 5 | 20 | 23 | 19 | 8 | 8 | 4 | 11 | | 3 | 4 | 55.9 | 27.1 | 15.4 |
| 6 | 20 | 23 | 19 | 8 | 8 | 4 | 11 | | 3 | 4 | 55.9 | 27.1 | 15.4 |
| 7 | 20 | 23 | 19 | | 12 | 8 | 11 | | 3 | 4 | 54.9 | 28.5 | 15.1 |
| 8 | 20 | 23 | 19 | 11 | 8 | 6 | 6 | | 3 | 4 | 52.6 | 30.1 | 15.8 |
| 9 | 22 | 15 | 15 | 11 | 8 | 4 | 10 | 8 | 3 | 4 | 59.4 | 24.8 | 14.3 |
| 10 | 22 | 19 | 19 | 11 | 8 | 4 | 10 | | 3 | 4 | 55.5 | 27.4 | 15.5 |
| 11 | 20 | 20 | 21 | | 8 | 7 | 17 | | 3 | 4 | 57.4 | 27.1 | 14 |
| 12 | 21 | 18 | 10 | 8 | 8 | 4 | 12 | 12 | 3 | 4 | 62.3 | 22.8 | 13.4 |
| 13 | 21 | 18 | 10 | 8 | 8 | 4 | 11 | 12 | 3 | 5 | 62.1 | 22.8 | 13.4 |
| 14 | 21 | 18 | 10 | 8 | 8 | 4 | 11 | 12 | 3 | 5 | 62.1 | 22.8 | 13.4 |
| 15 | 26 | 30 | 19 | 16 | | | 2 | | 3 | 4 | 51.6 | 30 | 16.7 |
| 16 | 26 | 22 | 10 | 16 | 8 | 1 | | 10 | 3 | 4 | 57.7 | 25.4 | 16.3 |

TABLE 2

Refractory compositions 1 to 16

Refractory composition

% by weight relative to total (a) + (b)

| N° | (a) + (b) | Organic fibers (c) | Surface-active agent (d) | Water (f) |
|----|-----------|--------------------|--------------------------|-----------|
| 1  | See Table 1 | 0.02% | 0.075% de A | 4.5 |
| 2  | | 0.02% | 0.5% of C | 5.1 |
| 3  | | 0.02% | 0.5% of C | 5.5 |
| 4  | | 0.02% | 0.5% of C | 5.2 |
| 5  | | 0.02% | 0.075% of A | 5.2 |
| 6  | | 0.02% | 0.5% of C | 5.0 |
| 7  | | 0.02% | 0.075% of A | 5.1 |
| 8  | | 0.02% | 0.3% of B | 4.9 |
| 9  | | 0.02% | 0.5% of C | 5.0 |
| 10 | | 0.02% | 0.5% of C | 5.1 |
| 11 | | 0.02% | 0.075% of A | 4.9 |
| 12 | | 0.02% | 0.3% of B | 4.7 |
| 13 | | 0.02% | 0.3% of B | 5.2 |
| 14 | | 0.02% | 0.5% of C | 5.2 |
| 15 | | 0.02% | 0.3% of B | 5.3 |
| 16 | | 0.02% | 0.3% of B | 5.2 |

TABLE 3

Results of tests carried out on materials obtained from refractory compositions 1 to 16

| N° | Particles of (a) + (b) (mesh passed) 0.5 µm | 2 µm | 10 µm | 40 µm | 500 µm | SiO2* (%) 0–500 µm | 0–40 µm | Results of tests P (bar) | Td$_{max}$ | ΔL % |
|----|------|------|------|------|------|------|------|------|------|------|
| 1  | 3.8 | 7.9 | 14.7 | 25.7 | 47 | 22.8 | 29.6 | >180 | 931 | 0.64 |
| 2  | 3.8 | 7.9 | 14.7 | 25.7 | 47 | | | >180 | | |
| 3  | 4 | 8.9 | 17.6 | 31.7 | 57.5 | 21.3 | 26.8 | 110 | 940 | 0.7 |
| 4  | 4 | 8.9 | 17.6 | 31.7 | 57.5 | 21.3 | 26.8 | 110 | 931 | 0.64 |
| 5  | 5.2 | 5.6 | 23.4 | 31.9 | 51.3 | 14.4 | 14.0 | 130 | 1107 | 0.3 |
| 6  | 5.2 | 5.6 | 23.4 | 31.9 | 51.3 | | | 130 | | |
| 7  | 5.1 | 10 | 23.3 | 29.1 | 31.9 | 13.1 | 11.5 | 180 | 1100 | 0.36 |
| 8  | 5.3 | 11.1 | 24.9 | 34.1 | 51.8 | 15.3 | 15.5 | 110 | 1095 | 0.43 |
| 9  | 5 | 10.6 | 23.9 | 33.1 | 50.3 | 12.6 | 14.5 | 80 | 1147 | 0.5 |
| 10 | 5.2 | 12.1 | 23.9 | 33.5 | 54 | 14.7 | 14.5 | 90 | 1053 | 0.64 |
| 11 | 6.9 | 15.5 | 28.2 | 34.5 | 54 | | | >180 | | |

TABLE 3-continued

Results of tests carried out on materials obtained from refractory compositions 1 to 16

| N° | Particles of (a) + (b) (mesh passed) | | | | | SiO2* (%) | | Results of tests | | |
|---|---|---|---|---|---|---|---|---|---|---|
| | 0.5 μm | 2 μm | 10 μm | 40 μm | 500 μm | 0–500 μm | 0–40 μm | P (bar) | Td$_{max}$ | ΔL % |
| 12 | 5.5 | 12 | 24.4 | 32.8 | 52.9 | 10.9 | 13.5 | 90 | 1122 | 0.44 |
| 13 | 5.3 | 12.3 | 23.9 | 32.8 | 52.9 | 10.9 | 13.5 | 80 | 1136 | 0.4 |
| 14 | 5.3 | 12.3 | 23.9 | 32.8 | 52.9 | | | 80 | | |
| 15 | 4.2 | 8.8 | 14.7 | 25.0 | 47.0 | 18.5 | 21.6 | >180 | 850 | 0.85 |
| 16 | 4.3 | 9 | 4.9 | 24.0 | 46.2 | 15.6 | 22.5 | >180 | 1090 | 0.33 |

*Silica content in % by weight relative to the fraction concerned.

The invention claimed is:

1. Unshaped refractory composition, in particular for producing glass furnace hearths, which comprises a basic mixture comprising:
   1 to 6% by weight of a hydraulic cement, and
   94 to 99% by weight of particles of at least one refractory material whose main constituents are alumina (Al$_2$O$_3$), zirconia (ZrO$_2$) and silica (SiO$_2$),
the fraction of the particles of said basic mixture having a size less than 40 μm being distributed in the following manner relative to the weight of said basic mixture:
   fraction<0.5 μm: ≧4% by weight
   fraction<2 μm: ≧5% by weight
   fraction<10 μm: ≧16% by weight
   fraction<40 μm: 29–45% by weight
said refractory composition further comprising, relative to the weight of said basic mixture,
   0.02 TO 0.08% by weight of organic fibers, and
   0.075 to 1% by weight of a surface-active agent.

2. Composition according to claim 1, wherein the fraction of the particles of said basic mixture having a size less than 40 μm is distributed in the following manner relative to the weight of said basic mixture:
   fraction<0.5 μm: ≧4% by weight,
   fraction<2 μm: ≧8% by weight,
   fraction<10 μm: ≧16% by weight,
   fraction<40 μm: ≧30–45% by weight.

3. Composition according to claim 1, comprising 0.1 to 1% by weight of said surface-active agent relative to the weight of said basic mixture.

4. Composition according to claim 1, wherein said basic mixture contains:
   Al$_2$O$_3$: 45–65% by weight,
   ZrO$_2$: 20–35% by weight,
   SiO$_2$: 12–20% by weight.

5. Composition according to claim 1, which further comprises 4 to 5.5% of water relative to the total weight of said basic mixture.

6. Composition according to claim 1, wherein the fraction of the particles of said basic mixture having a size less than 500 μm represents more than 50% by weight of said basic mixture.

7. Composition according to claims 1, wherein the fraction of the particles of said basic mixture having a size from 40 to 500 μm is from 15 to 30% by weight of said basic mixture.

8. Composition according to claim 1, wherein said refractory material particles contain 3 to 5% of fumed silica.

9. Composition according to claim 1, wherein the fraction of the particles of said mixture having a size of less than 40 μm is distributed in the following manner relative to the weight of said basic mixture:
   fraction<0.5 μm: ≧5% by weight,
   fraction<2 μm: ≧10% by weight,
   fraction<10 μm: ≧22% by weight,
   fraction<40 μm: 30–45% by weight.

10. Composition according to claim 1, wherein the proportion of silica in the fraction of said particles of said basic mixture having a size less than 500 μm is less than or equal to 16% by weight relative to the total weight of said fraction.

11. Composition according to claim 10, wherein the proportion of silica in the fraction of said particles of said basic mixture having a size less than 500 μm is less than or equal to 14.5% by weight relative to the total weight of said fraction.

12. Composition according to claim 1, wherein the proportion of silica in the fraction of said particles of said basic mixture having a size less than 40 μm is less than or equal to 14.5% by weight of the total weight of said fraction.

13. Composition according to claim 1, wherein said basic mixture comprises 3 to 5% by weight of said hydraulic cement.

14. Composition according to claim 1, comprising to 0.01 to 0.15% by weight of a hardening accelerator relative to the weight of said basic mixture.

15. Composition according to claim 1, wherein said surface-active agent is a compound from the family of modified polycarboxylates.

16. Refractory product obtained by sintering a refractory composition according to claim 1.

17. Refractory product according to claim 16, wherein $$((L_{max}-L_{1350})/L) \leq 0.5\%,$$

where L, $L_{max}$ and $L_{1350}$ designate the length of a sample of said product at ambient temperature, at a maximum expansion temperature, and at a temperature of 1350° C., respectively.

18. Refractory product according to claim 16, which has a maximum expansion temperature (Tdmax) greater than 1100° C.

* * * * *